United States Patent
Render et al.

(10) Patent No.: US 8,199,922 B2
(45) Date of Patent: Jun. 12, 2012

(54) ETHERNET ISOLATOR FOR MICROPHONICS SECURITY AND METHOD THEREOF

(75) Inventors: David S. J. Render, Belleville (CA); Marc Saunders, Belleville (CA); Dennis Pothier, Roslin (CA); Philip R. Ruttan, Belleville (CA); David W. Boggs, Fairfax, VA (US)

(73) Assignee: Avaya Inc., Basking Ridge, NJ (US)

( * ) Notice: Subject to any disclaimer, the term of this patent is extended or adjusted under 35 U.S.C. 154(b) by 866 days.

(21) Appl. No.: 12/275,587

(22) Filed: Nov. 21, 2008

(65) Prior Publication Data

US 2009/0161884 A1    Jun. 25, 2009

Related U.S. Application Data

(60) Provisional application No. 61/014,996, filed on Dec. 19, 2007.

(51) Int. Cl.
    *H04B 3/20*    (2006.01)
(52) U.S. Cl. .............................. 381/66; 381/65; 381/63
(58) Field of Classification Search ................. 381/63, 381/65–66
    See application file for complete search history.

(56) References Cited

U.S. PATENT DOCUMENTS

| | | | | |
|---|---|---|---|---|
| 3,996,537 A * | 12/1976 | Neuman | ........................ | 333/177 |
| 5,694,474 A * | 12/1997 | Ngo et al. | ........................ | 381/66 |
| 6,396,853 B1 * | 5/2002 | Humphrey et al. | ........... | 370/535 |
| 6,408,008 B1 * | 6/2002 | Komarek et al. | ............. | 370/458 |
| 6,662,135 B1 * | 12/2003 | Burns et al. | .................... | 702/120 |
| 6,735,291 B1 * | 5/2004 | Schmid et al. | ................. | 379/189 |
| 6,931,029 B1 * | 8/2005 | Pothier et al. | .................. | 370/503 |
| 7,110,417 B1 * | 9/2006 | El-Hennawey et al. | ...... | 370/437 |
| 7,194,249 B2 * | 3/2007 | Phillips et al. | ............. | 455/404.1 |
| 7,385,973 B1 * | 6/2008 | Johnson et al. | ............... | 370/389 |
| 7,389,104 B2 * | 6/2008 | Phillips et al. | ............. | 455/404.1 |
| 7,415,117 B2 * | 8/2008 | Tashev et al. | .................... | 381/92 |
| 7,734,282 B2 * | 6/2010 | Casey et al. | ............... | 455/414.3 |
| 7,921,443 B2 * | 4/2011 | Phillips et al. | ................... | 725/80 |
| 8,035,461 B1 * | 10/2011 | Barrett | .......................... | 333/177 |
| 2002/0071573 A1 * | 6/2002 | Finn | ................................ | 381/93 |
| 2005/0048957 A1 * | 3/2005 | Casey et al. | ............... | 455/414.3 |
| 2009/0161884 A1 * | 6/2009 | Render et al. | ................... | 381/66 |
| 2011/0058671 A1 * | 3/2011 | Tomasso et al. | ............. | 380/255 |
| 2011/0058676 A1 * | 3/2011 | Visser | ............................... | 381/17 |
| 2011/0087879 A1 * | 4/2011 | Chand et al. | .................. | 713/153 |
| 2011/0135091 A1 * | 6/2011 | Radatti | ......................... | 380/247 |
| 2011/0135093 A1 * | 6/2011 | Radatti | ......................... | 380/257 |

* cited by examiner

*Primary Examiner* — Laura Menz
(74) *Attorney, Agent, or Firm* — Christopher & Weisberg, P.A.

(57) ABSTRACT

A system and method for providing microphonic isolation on a transmission line. The transmission line has a first part and a second part. The first part of transmission line carries a data signal and a microphonic signal. The microphonic signal has frequencies that include those in a range of substantially 20 Hz to substantially 20 kHz. The system includes an isolation apparatus. The isolation apparatus has an input in electrical communication with a first part of the transmission line, an output in electrical communication with the second part of the transmission line, and a filter in electrical communication with the input and the output. The filter is arranged to substantially remove the microphonic signal received at the input from first part of transmission line and pass the data signal to the output.

11 Claims, 2 Drawing Sheets

ETHERNET ISOLATOR FOR MICROPHONICS SECURITY AND METHOD THEREOF

CROSS-REFERENCE TO RELATED APPLICATIONS

The present invention is related to and claims priority to U.S. Provisional Patent Application No. 61/014,996, filed Dec. 19, 2007, entitled ETHERNET ISOLATOR FOR MICROPHONICS SECURITY, the entire contents of which is incorporated herein by reference.

FIELD OF THE INVENTION

The present invention relates to secure data communications, and in particular, toward a method and system for filtering or otherwise removing microphonic signal transmissions transduced by an electronic device.

BACKGROUND OF THE INVENTION

Energy transformation is the process of transforming one form of energy to another. The sun, wind, water, natural gas, coal, oil, are examples of energy sources. Sound, like the sound made by someone's vocal cords, also carries energy.

A transducer is a device which converts one form of energy into another. In an acoustical context, this usually means converting sound energy into electrical energy. Sound is a wave which is created by vibrating objects and propagated through a medium from one location to another. A wave can be described as a disturbance that travels through a medium, transporting energy from one location to another location. The medium is simply the material through which the disturbance is moving.

Usually the medium for a sound wave is air, though it could be any material such as water or steel. Particles in the medium are periodically displaced by a sound wave, and thus oscillate. The energy carried by the sound wave converts back and forth between the potential energy of the extra compression of the medium and the kinetic energy of the oscillations of the medium.

The medium is simply a series of interconnected and interacting particles. The vibrating object which creates the disturbance could be the vocal chords of a person, the vibrating string of a guitar, or the vibrating diaphragm of a radio speaker. The sound wave is transported from one location to another by means of particle-to-particle interaction. If the sound wave is moving through air, then as one air particle is displaced from its equilibrium position, it exerts a push or pull on neighboring air particles. This particle interaction continues throughout the entire medium, with each particle interacting and causing a disturbance of its nearest neighbors.

The energy in sound waves can be transformed into electrical energy. Microphonics is the generation of electrical signals when an object or component is excited by audio sound waves. For example, when an electronic device or appliance (such as a telephone, computing device, etc.) having a communication wire or conduit leading away from it is excited by audible noises, the audible noises affecting the device result in a corresponding electrical signal transmission along the wire or conduit. While such unintended transmissions may be typically disregarded as a negligible occurrence with little consequence, the unintended signal voltages and transmissions resulting from audible signals become problematic when these voltages can be monitored or intercepted outside a secure location through an Ethernet wire or other conductor. For example, the intelligible speech that can occur in the audio band between 20 Hz and 20 kHz in a secure room or location can be transduced by an electronic device and excite communication lines leading away from the site, which could result in the unintended and/or undesirable transmission or disclosure of sensitive information.

The Telecommunications Security Group ("TSG") standard No. 5 specifies the minimum required performance for a telephone that can be located in a sensitive discussion area. The TSG standards contain guidance involving telephone systems located in areas where sensitive government information is discussed, processed, and stored. The National Telecommunications Security Working Group ("NTSWG"), formerly known as the Telecommunications Security Group ("TSG"), is a Joint Working Group of the Committee on National Security Systems which was established to protect National Security Systems. The NTSWG is responsible for security countermeasures for all telecommunications systems and components used within a classified information processing area. The NTSWG is the primary technical and policy resource in the US Intelligence Community for all aspects of the technical surveillance countermeasures program involving telephone systems. The acceptance criteria and tests presented in the TSG Standard No. 5 are for use in manufacturing and procurement of telephone instruments.

For example, in order to comply with the TSG Standard No. 5, while a telephone is on-hook, i.e. in the idle state, the telephone must not be able to pick up and transmit audio to the mounting cord. The term "on-hook" refers to hanging up or otherwise deactivating communication of the telephone/communication device. The telephone must not exhibit intrinsic microphonic behavior with respect to any of the conductors leaving the body of the instrument that further leave the secure area where the telephone is located, e.g., the specific office or room. The non-microphonic characteristic must be sustained independent of all environmental stimuli, including acoustic and electromagnetic fields, voltages, or commands that could be impressed on mounting cord or power supply wires.

Also, without a manual action by the user, neither the system nor an incoming call is permitted to alter the telephone's non-microphonic characteristics or cause it to be off-hook. As used herein, the term "off-hook" refers to lifting the handset from the cradle or otherwise activating telephone/communication device for communication. The ideal condition for on-hook audio security is that the telephone cannot by any means be caused to produce audio when it is on-hook. For real telephones, however, there is always a possibility that accidental or deliberate modifications could cause it to pass audio. Measures to minimize this possibility must be applied. The design and construction of a telephone or other communication device must not facilitate any modification that could cause it to pass audio or become microphonic while on-hook.

Of note, although the present invention is discussed and referenced with respect to compliance with TSG Standard No. 5, such reference is intended to include other telephone microphonic standards such as the Committee on National Security Systems ("CNSS") Instructions such as CNSS Instruction No. 5001.

Accordingly, it is desirable to provide a method and system to filter and/or remove microphonic signals that could be unintentionally transmitted from communication devices coupled to a network. It is further desirable to provide a method and system to filter microphonic signals that is readily integrated with numerous existing devices and systems already in place.

SUMMARY OF THE INVENTION

The present invention provides a system, method and device for microphonically isolating an electronic device, such as a telephone, computer, etc., in a secure, i.e., protected, location, from a secondary unsecure location. In such case, a data signal and induced microphonic signal are present on a transmission line and input to an isolation device. The isolation device substantially removes the microphonic signal and passes substantially only the data signal on to the secondary unsecure location.

In accordance with one aspect, the present invention provides a system for providing microphonic isolation on a transmission line. The transmission line has a first part and a second part. The first part of transmission line carries a data signal and a microphonic signal. The microphonic signal has frequencies that include those in a range of substantially 20 Hz to substantially 20 kHz. The system includes an isolation apparatus. The isolation apparatus has an input in electrical communication with a first part of the transmission line, an output in electrical communication with the second part of the transmission line, and a filter in electrical communication with the input and the output. The filter is arranged to substantially remove the microphonic signal received at the input from first part of transmission line and pass the data signal to the output.

In accordance with another aspect, the present invention provides a method for providing microphonic isolation on a transmission line. The transmission line has a first part and a second part in which the first part of transmission line carries a data signal and a microphonic signal. The microphonic signal has frequencies that include those in a range of substantially 20 Hz to substantially 20 kHz. The data signal and the microphonic signal are received from the first part of the transmission line. The microphonic signal received from the first part of transmission line is substantially removed using an isolation apparatus having a filter. The data signal is output on the second part of the transmission line.

In accordance with still another aspect, the present invention provides an isolation device for providing microphonic isolation on a transmission line. The transmission line has a first part and a second part. The first part of transmission line carries a data signal and a microphonic signal. The microphonic signal has frequencies that include those in a range of substantially 20 Hz to substantially 20 kHz. The isolation device has an input in electrical communication with a first part of the transmission line, an output in electrical communication with the second part of the transmission line, and a filter in electrical communication with the input and the output. The filter is arranged to substantially remove the microphonic signal received at the input from first part of transmission line and pass the data signal to the output. A sound isolating compound enveloping at least a portion of the filter. An optical isolation circuit is in electrical communication with input and the filter.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein like designations refer to like elements, and wherein.

DETAILED DESCRIPTION OF THE INVENTION

The present invention provides a method and system to filter and/or remove microphonic signals that could be unintentionally transmitted from communication devices coupled to a network that is readily integrated with numerous existing devices and systems already in place.

The Ethernet isolation system can be used to interrupt the transmission of microphonics from an Ethernet appliance such as an IP set, e.g., IP phone, or a PC in such a way that it is possible to meet the NTSWG standards. The Ethernet isolation system allows an Ethernet appliance which can't pass the NTSWG microphonics test standard because it generates microphonic signals which are passed through the Ethernet cable, to pass the NTSWG microphonics test when utilizing the Ethernet isolator.

Figure 1:
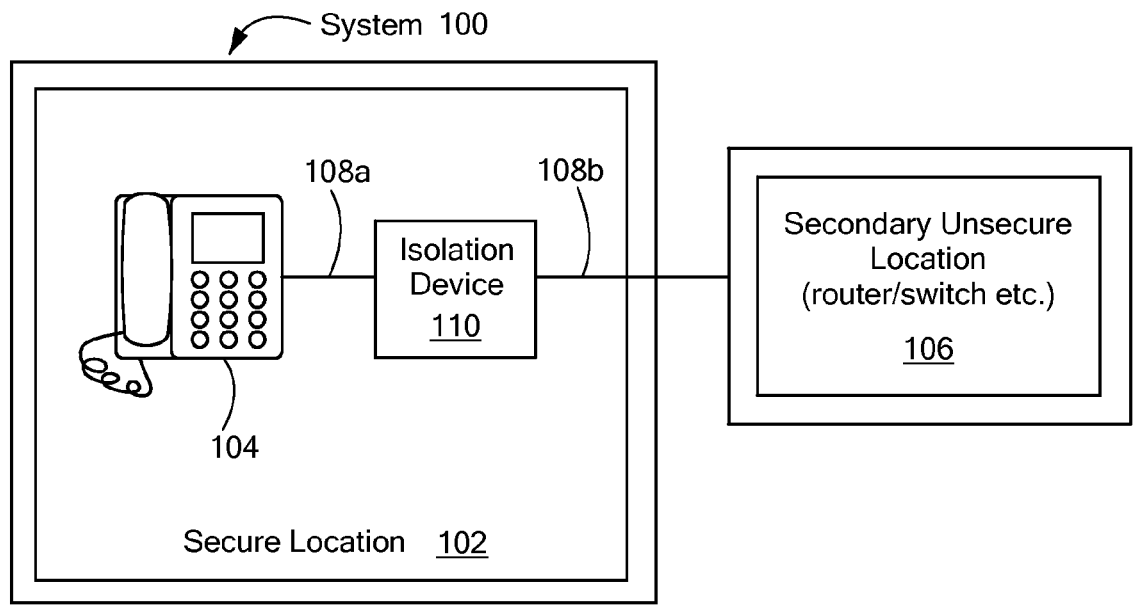
FIG. 1 is a block diagram of an embodiment of a microphonics Ethernet isolation system constructed in accordance with the principles of the present invention.

Referring now to the drawing figures in which like reference designators refer to like elements, there is shown in FIG. 1 an exemplary microphonics isolation system constructed in accordance with the principles of the present invention and designated generally as "100". The system 100 generally includes a secure location 102 having one or more electronic devices 104 located therein. The secure location 102 may include a room, a building, and/or any other contained space where it is desirable to prevent the uncontrolled and/or unintended transmission of information, conversations, and/or audible communications. The one or more electronic devices 104 may include electronic devices electrically coupled to or in communication with a secondary location 106 exterior to the secure location. For example, the one or more electronic devices 104 may include a telephone device (whether on a typical plain old telephone system ("POTS") line, in an Ethernet-based Transmission Control Protocol/Internet Protocol ("TCP/IP") configuration, etc.), a computing device such as a personal computer and/or laptop, and any other device having a wire, cable or other communication/transmission conduit 108 that extends from the device away from the secure location towards the secondary unsecured location 106, which may include a switch box, router, etc.

The microphonics isolation system further includes an apparatus such as microphonic isolation device 110 coupled to and/or otherwise in electrical communication with the one or more electronic devices 104 to filter, reduce, and/or eliminate the transmission or propagation of microphonic signals along the transmission line 108 and out of the secure location 102. For example, the microphonics isolation device 110 may provide for the filtering and/or elimination of signals propagating along the transmission line 108 corresponding to the intelligible speech range transduced by a particular electronic device 104. The frequency band corresponding to an audible signal range may be separated and removed from a data frequency range, such as an Ethernet carrier frequency in the range of 10 Megabits ("Mbit") per second to well over 1 Gigabit ("Gbit") per second. Moreover, the isolation device 110 may be electrically coupled to the transmission conduit 108 within the secure location 102 to thus prevent the undesired microphonic transmission to the secondary location 106.

In accordance with this arrangement, a first part of the transmission line 108a couples device 104 to the input of isolation device 110, while a second part of the transmission line 108b couples the output of the isolation device 110 to the secondary location 106. Note, the first part of the transmission line, i.e., reference 108a, and the second part of the transmission line, i.e., reference 108b, are referred to collectively herein as transmission line 108.

The isolation device 110 may provide optical and/or mechanical isolation of the one or more electronic devices 104 to prevent the transmission of the unwanted signal components corresponding to the audible noises impacting the devices 104. Although the drawing figures show a system 100 having unidirectional communication from device 104 to devices outside the secure area 102, e.g., devices located at location 106, such is provided only for ease of explanation of the present invention. It is understood and contemplated that a reverse, converse and/or mirrored configuration for microphonically isolating a communication path for communications to the electronic device 104 may be used provide bidirectional communication while still providing microphonic isolation of both the transmit and receive communication paths when such paths are discrete.

Figure 2:
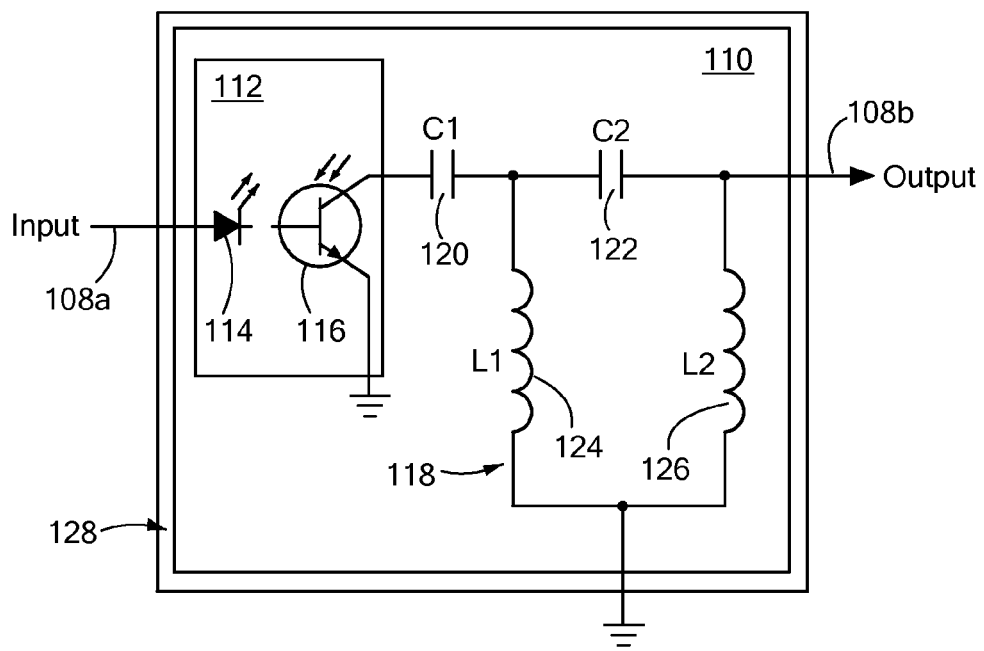
FIG. 2 is a block diagram of an embodiment of the microphonics Ethernet isolation system of FIG. 1 containing an optical isolator and a high pass filter.

For example, FIG. 2 shows that an exemplary isolation device 110 constructed in accordance with the principles of the present invention may include an optical isolator 112 having a light source 114, such as a light emitting diode ("LED"), opposite a phototransistor 116, where the two components are electrically separated so that light may travel across a barrier or space there between while electrical current may not.

The optical isolator 112 may be configured to convey only those signals having frequencies and/or voltages corresponding to the intended data transmission. In other words, frequencies and/or voltages occurring along the transmission conduit as a result of the audible noises, i.e., speech or other audio signals in the 20 Hz to 20 kHz range, affecting the electronic devices 104 are not propagated. For example, the isolation device 110 may include a circuit (not shown) having resistance and/or impedance characteristics that prevent a lower amplitude and or frequency signal from actuating the light source, i.e., the signal output from the circuit at the filtered frequency band may simply be insufficient to excite the light source 114, thereby filtering the unwanted signal components from being propagated along the transmission conduit 108. In particular, an embodiment constructed in accordance with the principles of the present invention allows for the unhindered passage of Ethernet communications, e.g., 10 Mbit/sec., 100 Mbit/sec. and/or 1,000 Mbit/sec. baseband communication, while filtering out microphonic constituent components in the signal path in the audible frequency range, e.g., 20 Hz-20 kHZ, where voice microphonic communications are to be blocked.

The isolation device 110 may include a high pass filter 118, comprising capacitors C1 120, C2 122, inductors L1 124, L2 126, and/or a grounding scheme that prevents the unwanted microphonic signals from passing through the electronic devices 104 and/or the transmission conduit 108.

Figure 3:
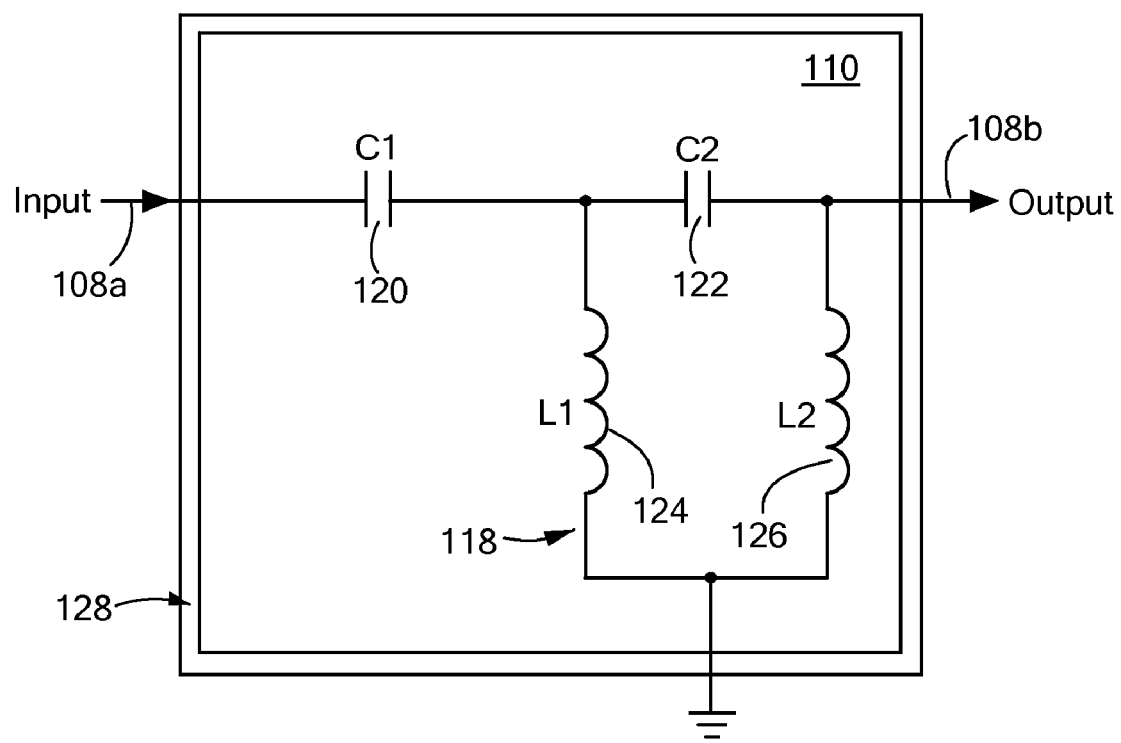
FIG. 3 is a block diagram of an embodiment of the microphonics Ethernet isolation system of FIG. 1 with a high pass filter.

The present invention may also be implemented without the optical isolator 112. FIG. 3 shows a fourth order Butterworth High Pass Filter 118 composed of capacitors C1 120, C2 122, and inductors L1 124, and L2 126 that could serve as isolation device 110. Other types of filters not shown can be used to implement the invention.

The isolation device 110 can be located either externally to the electronic device or appliance 104 being protected, may be connected to the transmission conduit 108 (such as an Ethernet cable, for example) directly, or may further be integrated into the electronic device adjacent to a transmission conduit connector in the internal circuitry of the appliance or device. Additionally the device circuitry may be insulated from surrounding audio waves through an isolation medium 128, such as a sound potting compound.

The isolation device 110 may be passively powered by voltages existing on the transmission conduit 108. For example, the isolation device may power the components therein via the voltage conducted through an Ethernet cable or the like when a signal is being transmitted. Of course, power may also be provided by an active electrical source (not shown), such as a battery or a separate power line to the isolation device. In a passively powered configuration where the isolation device 110 may be operable only when the electronic device 104 is powered on and transmitting a signal.

Figure 4:
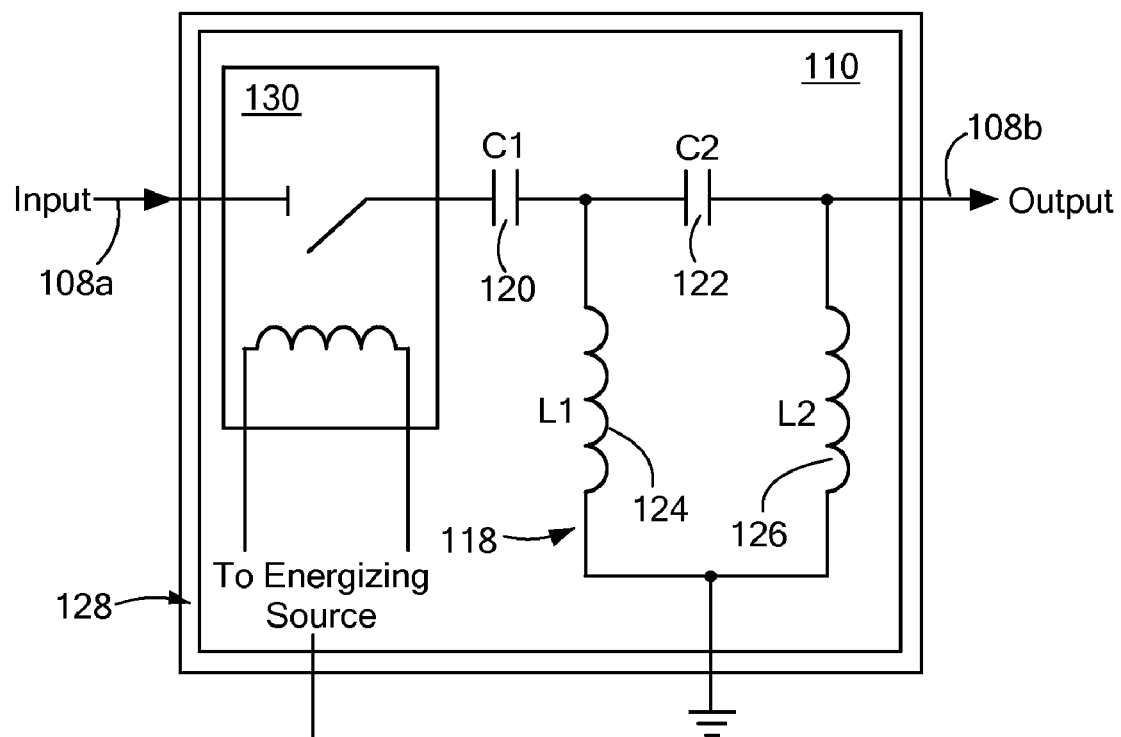
FIG. 4 is a block diagram of the microphonics Ethernet isolation system of FIG. 1 containing a relay and a high pass filter.

FIG. 4 shows an embodiment of isolation device that further includes a switch, relay, or other signal interrupt mechanism 130 that prevents signals from being electrically conducted to the isolation device 110 and/or through the transmission conduit 108 to the secondary location 106 when the signal interrupt mechanism 130 is not energized, e.g., electronic device 104 (or other energizing source) is not powered on. In an alternative arrangement, the energizing source leads of signal interrupt mechanism 130 can be coupled to a battery or a power switch so that when the power switch is on, the signal interrupt mechanism 130 would allow the signal to flow from the input to the filter 118. Of note, the embodiments in FIG. 2 and FIG. 4 can be combined to create an isolation device that comprises a relay, an optical isolator and a filter.

Although not shown, it is contemplated that isolation device 110 need not be a separate stand-alone device. It is contemplated that isolation device 110 can be integrated, i.e., affixed to or contained partially or totally within, the housing of electronic device 104. In addition, although the present invention is described with respect to an Ethernet data signal, the present invention is not limited to such. The data signal can be a signal using any suitable protocol as long as removal of the frequency components in the range removed to eliminate the microphonics signal component will not adversely impact transmission of the data signal.

The present invention provides for the elimination and/or interruption of the transmission of unwanted microphonic signals from a data/computing appliance such as an Internet Protocol ("IP") phone set or a PC. Moreover, the isolation device of the present invention eliminates the unwanted transmissions in such a way that it is possible to enable an otherwise nonconforming device to meet the TSG Standard No. 5. In particular, the present invention allows an Ethernet appliance which would be unable to pass the TSG Standard No. 5 test on its own due to the generation of microphonic signals to subsequently pass the TSG Standard No. 5 test when utilizing the isolation system and methods disclosed herein. The present invention may further be readily integrated to existing systems without requiring a change and/or modification of presently used electronic devices.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for providing microphonic isolation on a transmission line, the transmission line having a first part and a second part, the first part of transmission line carrying a data signal and a microphonic signal, the microphonic signal having frequencies that include those in a range of substantially 20 Hz to substantially 20 kHz, the system comprising:

an isolation apparatus having:
an input in electrical communication with a first part of the transmission line;
an output in electrical communication with the second part of the transmission line and;
a filter in electrical communication with the input and the output, the filter arranged to substantially remove the microphonic signal received at the input from first part of transmission line and pass the data signal to the output;
wherein the isolation apparatus further comprises a sound isolating compound enveloping at least a portion of the filter.

2. The system according to claim 1, wherein the transmission line is an Ethernet transmission line.

3. The system according to claim 1, further comprising an electronic device electrically coupled to the first part of the transmission line, the electronic device transducing the microphonic signal into the first part of the transmission line.

4. The system according to claim 3, wherein the electronic device includes a telephone.

5. The system according to claim 3, wherein the electronic device includes a computer.

6. The system according to claim 1, wherein the isolation apparatus further comprises a signal interrupt mechanism, the signal interrupt mechanism being electrically coupled to the filter and to the input, the signal interrupt mechanism preventing signal transmission to the filter when the signal interrupt mechanism is not energized.

7. The system according to claim 1, further comprising an optical isolation circuit electrically coupled to the first part of the transmission line and to the filter.

8. The system according to claim 1, wherein the electronic device includes a housing, the isolation apparatus being integrated into the housing.

9. The system according to claim 1, wherein the filter includes a high pass filter in electrical communication with the transmission line.

10. A device providing microphonic isolation on a transmission line, the transmission line having a first part and a second part, the first part of transmission line carrying a data signal and a microphonic signal, the microphonic signal having frequencies that include those in a range of substantially 20 Hz to substantially 20 kHz, the device comprising:

an input in electrical communication with a first part of the transmission line;
an output in electrical communication with the second part of the transmission line and;
a filter in electrical communication with the input and the output, the filter arranged to substantially remove the microphonic signal received at the input from first part of transmission line and pass the data signal to the output;
a sound isolating compound enveloping at least a portion of the filter; and
an optical isolation circuit in electrical communication with input and the filter.

11. The device of claim 10, further comprising a signal interrupt mechanism, the signal interrupt mechanism being electrically coupled to the filter and to the input, the signal interrupt mechanism preventing signal transmission to the filter when the signal interrupt mechanism is not energized.

\* \* \* \* \*